United States Patent [19]

Kikuta

[11] Patent Number: 4,942,391
[45] Date of Patent: Jul. 17, 1990

[54] PICTURE INFORMATION COMPOSITE SYSTEM

[75] Inventor: Keiichi Kikuta, Osaka, Japan

[73] Assignee: NEC Home Electronics Ltd., Osaka, Japan

[21] Appl. No.: 237,521

[22] Filed: Aug. 29, 1988

[30] Foreign Application Priority Data

Aug. 31, 1987 [JP] Japan .................................. 62-216974

[51] Int. Cl.$^5$ ................................................ G06F 3/14
[52] U.S. Cl. ..................................... 340/745; 340/814;
340/716
[58] Field of Search ............... 340/717, 798, 799, 750,
340/732, 745, 794, 814, 723, 716; 364/518, 521,
522, 200, 900

[56] References Cited

U.S. PATENT DOCUMENTS 4,094,000 6/1978 Brudevold ........................... 340/750

Primary Examiner—Alvin Oberley
Attorney, Agent, or Firm—Cushman, Darby & Cushman

[57] ABSTRACT

The present invention provides a composite picture information system that is able to compose pictures from digital data from separate sources. An extended (main) information processor (40) is mechanically configured so that an auxiliary information processor (10) can be docked with it. The extended and auxiliary information processors are each configured so that they can be independently operated and can each provide as an output an analog video signal defining a picture. When the information processors are docked, the auxiliary information processor stops generating its own video signal. Instead, it reads out digital display data based on a synchronizing signal provided by an extended (main) information processor, and provides its digital data to the extended (main) information processor. The extended information processor composes a composite image and creates a video signal indicative of the composed image using its own digital display data and the digital display data provided by the auxiliary information processor. The composite picture is composed digitally and then converted to a video signal thereby providing a very accurate composite picture.

7 Claims, 6 Drawing Sheets

PICTURE INFORMATION COMPOSITE SYSTEM

BACKGROUND OF THE INVENTION

1. Field of Invention

The present information relates to television picture information processing. More specifically, the invention relates to systems for generating a video signal by composing one or more digital image data.

2. Description of the Prior Art

In a conventional picture information composite system, to present a composite picture on a television screen, the system switches back and forth between analog video signals defining each of the pictures being assembled together on the screen. In other words, at a point in the scan of a field, when it is desired to switch from a first picture to a second picture, the scan switches from the analog signal representing the first picture to the analog signal representing the second picture. The composite picture is composed by switching back and forth as often as necessary to compose a picture for display that includes the first and second pictures, appropriately combined. However, in superimposing pictures in this manner, there are inherent difficulties and inaccuracies that exist, preventing one from obtaining a clear composite picture. Neither the first nor the second picture can be precisely and accurately composed. Furthermore, in a conventional picture information composite system, access being sequential, there is an imperfect correspondence between the first and second pictures, i.e., corresponding points in time between the first and second pictures are not simultaneously displayed.

SUMMARY OF THE INVENTION

It is an object of the present invention to provide a composite picture information system which overcomes the problems associated with the prior art, as discussed above. The present invention takes an approach different from that of the prior art by composing the composite image digitally and then generating a video signal based on the digital composition.

The present invention provides a composite picture information system that is able to compose pictures from digital data from separate sources. An extended (main) information processor (40) is mechanically configured so that an auxiliary information processor (10) can be docked with it. The extended and auxiliary information processors are each configured so that they can be independently operated and can each provide as an output an analog video signal defining a picture. When the information processors are docked, the auxiliary information processor stops generating its own video signal. Instead, it reads out digital display data based on a synchronizing signal provided by an extended (main) information processor, and provides its digital data to the extended (main) information processor. The extended information processor composes a composite image and creates a video signal indicative of the composed image using its own digital display data and the digital display data provided by the auxiliary information processor. The composite picture is composed digitally and then converted to a video signal thereby providing a very accurate composite picture. Although the invention is described using as an example (the presently preferred embodiment) two information processors (extended information processor and auxiliary information processor), the invention is not limited to the use of only two information processors.

Specifically, the structure of the presently preferred embodiment is a follows The video processing system according to the present invention includes:
an extended information processor including:
a case having an information processor housing portion accessible via a housing port in a front panel of said case,
a first electrical connector,
an input/output (I/0) port, coupled to said first connector,
a first bus coupled to said I/0 port,
a first information processing part coupled to said first bus, and providing a chip select signal,
a first display part, coupled to said first connector and to said first bus and receiving said chip select signal, for providing a video output signal; and
an auxiliary information processor including:
a case configured so that it can be docked with said extended information processor by slipping it into said information processor housing portion of said extended information processor via said housing port,
a second electrical connector which is interconnected with said first connector when said auxiliary information processor is docked with said extended information processor,
a second bus coupled to said second connector,
a third bus coupled to said second connector,
a second information processing part coupled to said second bus,
a second display part, coupled to said second and third busses, and
video output means, coupled to said second display part, for outputting a video signal from said second display part.

DETAILED DESCRIPTION OF THE PREFERRED EMBODIMENT

The invention will be described in detail with reference to accompanying drawings.

First, the individual information processors used in the present invention will be described. Thereafter, an embodiment of the present invention which includes various individual information processors will be described.

Figure 4:
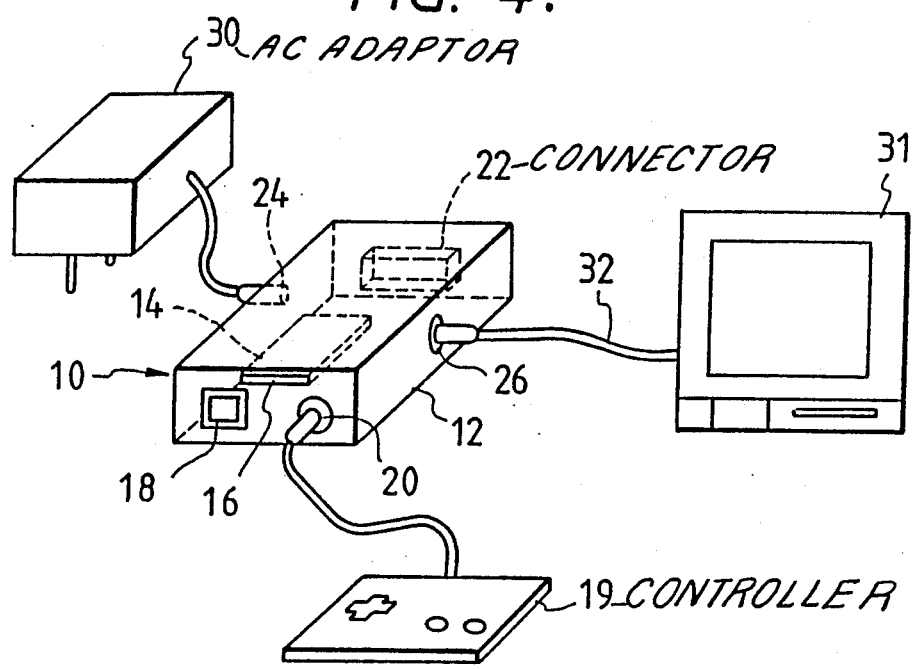
FIG. 4 is a perspective view showing an auxiliary information processor forming a part of the invention; p

FIG. 4 is a perspective view showing an auxiliary information processor 10 forming a part of the present invention. Auxiliary information processor 10 can be used independently or it can be "docked" with an extended information processor 40 (shown in FIG. 6). A case 12 of auxiliary information processor 10 houses its various component parts. Auxiliary information processor 10 includes an information processing part (element 34 - shown in FIG. 5) including a memory and an arithmetic processor, and a display part including video RAM, a display control device and a display circuit (see FIG. 5), driven and controlled by this information processing part. Auxiliary information processor 10 may output a video signal independently of any other information processors in the system. In case 12, there is provided an IC card housing 14 and an IC card inserting port 16. Furthermore, there is provided on the front surface of case 12 a connector 20 for a controller to connect a power switch 18 and a controller 19, and a connector 22 on the rear side of case 12. Connector 22 is used for connecting auxiliary information processor 10 to an extended information processor which will be described later. Connector 22 includes a power supply connecting portion (not shown) for providing power to the auxiliary information processor. On one side surface of case 12, there is provided a connector 24 for connecting an AC adapter for providing power when auxiliary information processor 10 is used independently (not docked with extended information processor 40). On another side surface of case 12 there is provided a connector 26 for connecting an output cable. To connector 26 there may be connected a picture image output cable 32, which sends a video signal generated by auxiliary information processor 10 to a display unit, such as a television, 31.

Figure 5:
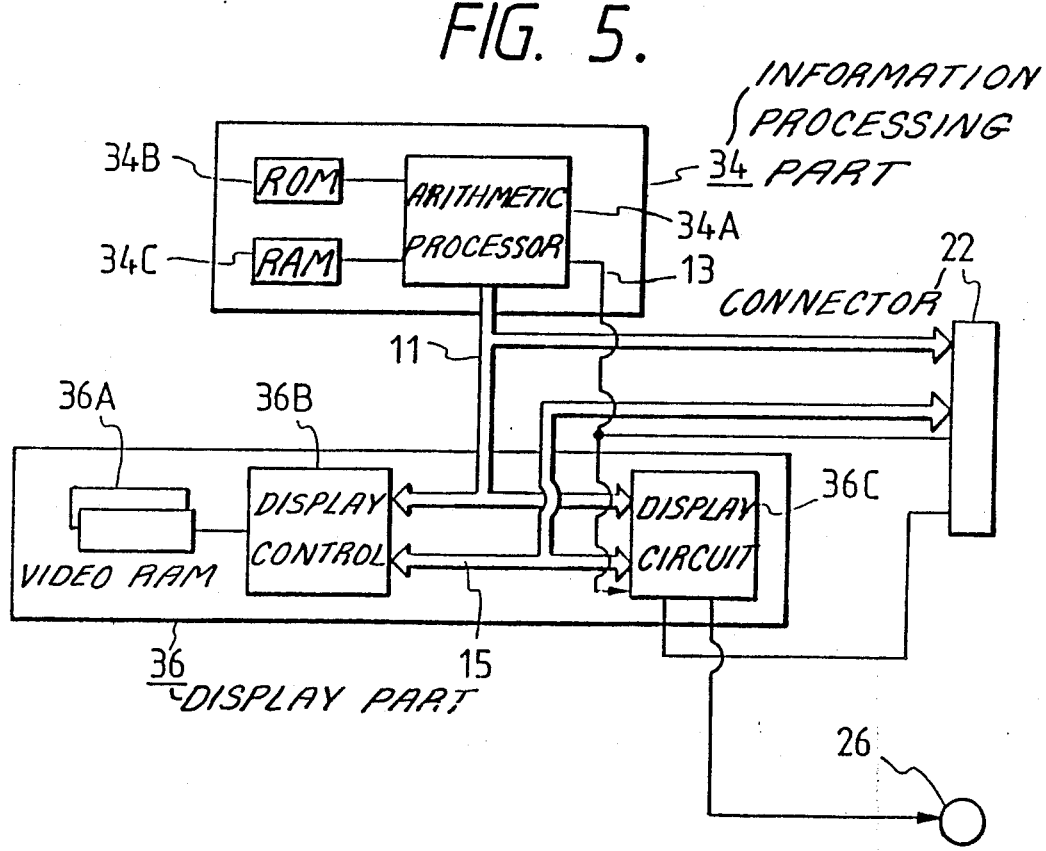
FIG. 5 is a block diagram of an auxiliary information processor.

FIG. 5 is a block diagram of a portion of auxiliary information processor 10. Auxiliary information processor 10 includes an information processing part 34 which includes an arithmetic processor 34A, a ROM 34B and a RAM 34C. Auxiliary information processor 10 also includes a display part 36 driven by information processing part 34. Display part 36 includes a video RAM 36A, a display controller 36B and a display circuit 36C. Display controller 36B reads displayed data by means of a synchronizing signal from the extended information processor when auxiliary information processor 10 is docked with the extended information processor. Display circuit 36C stops the display function and puts the synchronous output at a high impedance at the time the auxiliary information processor is docked with the extended information processor. When auxiliary information processor 10 is being independently operated (not docked), display circuit 36C is operated so that a video signal may be formed based on display data that are read out from the video RAM 36A by means of the display controller 36B, thereby outputting the video signal.

Figure 6:
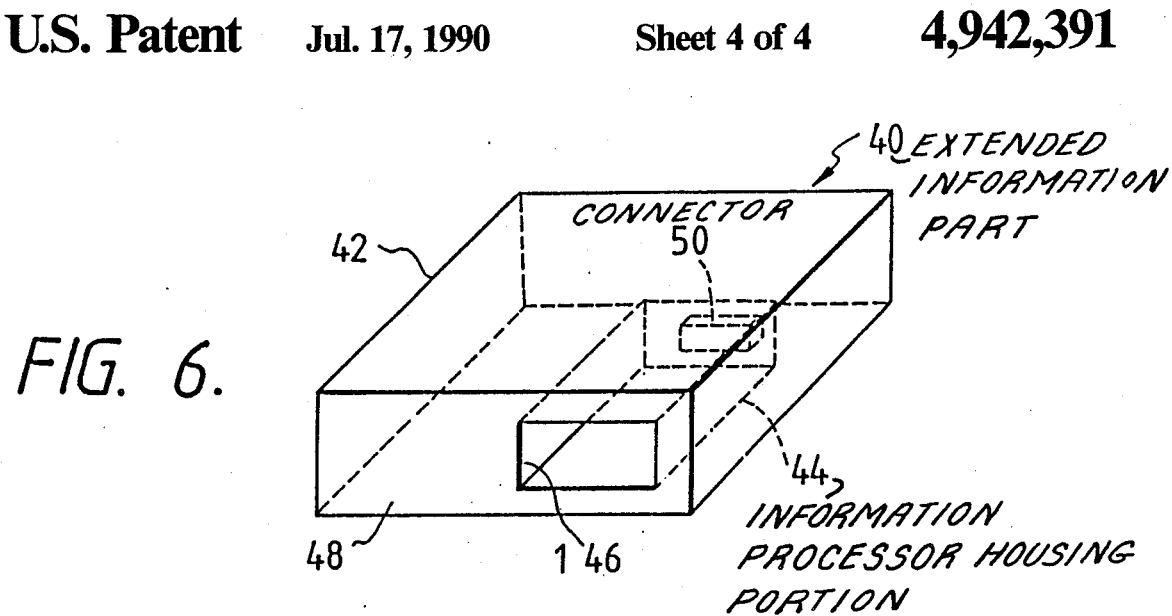
FIG. 6 is a perspective view of a main information processor used in the invention.

FIG. 6 is a perspective view of the extended information processor 40 forming a part of the present invention. The various elements of extended information processor 40 are housed within a case 42 having an information processor housing portion 44 extending from a housing port 46 on a front panel 48 of extended information processor 40 towards its rear panel. At the rear portion of information processor housing portion 44 there is provided an electrical connector 50 for electrically interconnecting extended information processor 40 with auxiliary information processor 10 when it is docked with the extended information processor.

Figure 7:
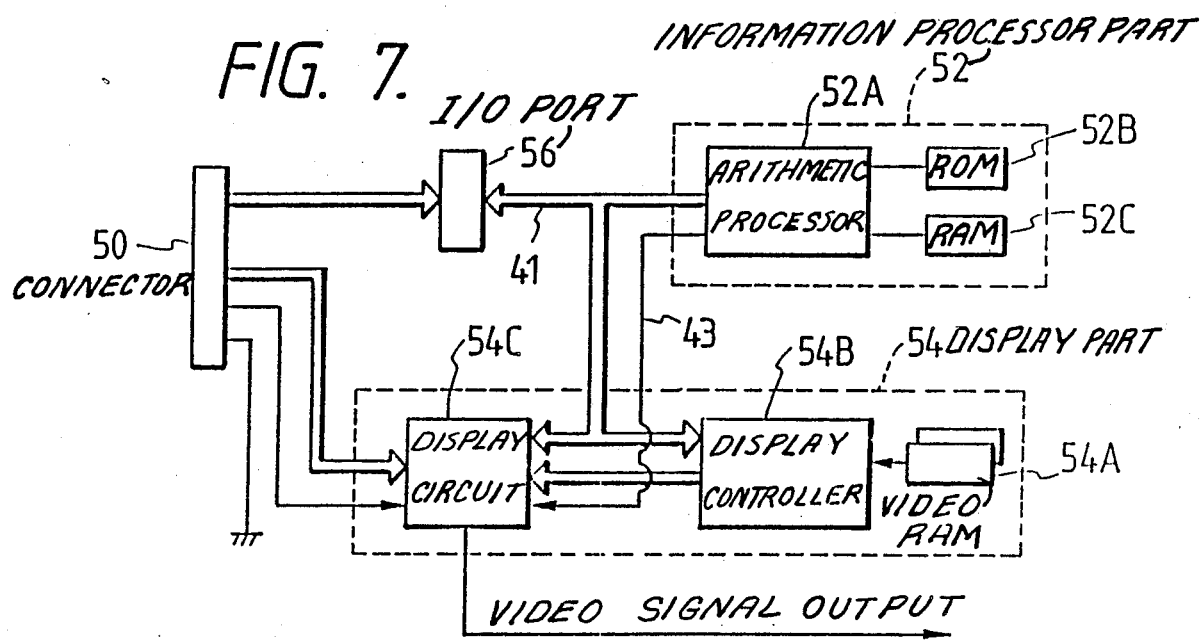
FIG. 7 is a block diagram of the main information processor.

FIG. 7 is a block diagram of extended information processor 40. An information processing part 52 includes an arithmetic processor 52A, a ROM 52B and a RAM 52C. A display part 54 is controlled by information processing part 52. Display part 54 includes a video RAM 54A, a self-display controller 54B and a display circuit 54C which composes the output from display controller 36B of auxiliary information processor 10 and the output from self-display controller 54B and also outputs a synchronizing signal. An input-output (I/0) port 56 provides appropriate signal interfacing between extended information processor 40 and auxiliary information processor 10. Extended information processor 40 is constructed so that it can be operated independently, i.e., without auxiliary information processor 10 being docked therewith. During independent operation of extended information processor 40, display circuit 54C is operated, a video signal is formed based on display data read out from a video RAM 54A by means of a display controller 54B, and the video signal may be output or displayed.

Figure 8:
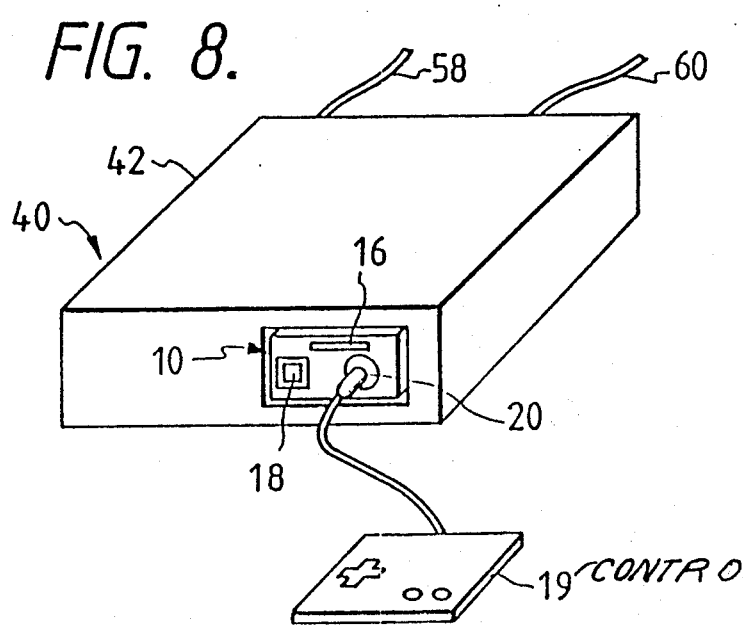
FIG. 8 shows the auxiliary information processor and the main information processor.

FIG. 8 shows extended information processor 40 having auxiliary information processor 10 docked therewith by being inserted into port 46 of extended information processor 40. When the auxiliary information processor is docked with the extended information processor, AC adapter 30 and video output cable 32 are removed from auxiliary information processor 10. Auxiliary information processor 10 is inserted into housing portion 44 of extended information processor 40 via housing port 46. When auxiliary information processor 10 is inserted into case 42 up to a predetermined position thereof and attached to the extended information processor 40, connector 22 and connector 50 are connected with each other. In this manner auxiliary information processor 10 and extended information processor 40 become integrated both mechanically and electrically (via connectors 22 and 50). When the two information processors are docked, power switch 18, IC card inserting port 16 and connector 20 for a controller, provided on the front side of the information processor 10, are exposed to the outside of extended information processor 40. Power cable 58 and a video output cable 60 are connected to extended information processor 40, which may provide power to auxiliary information processor 40 and transmit an output signal including information provided by the auxiliary information processor and the extended information processor.

Figure 1:
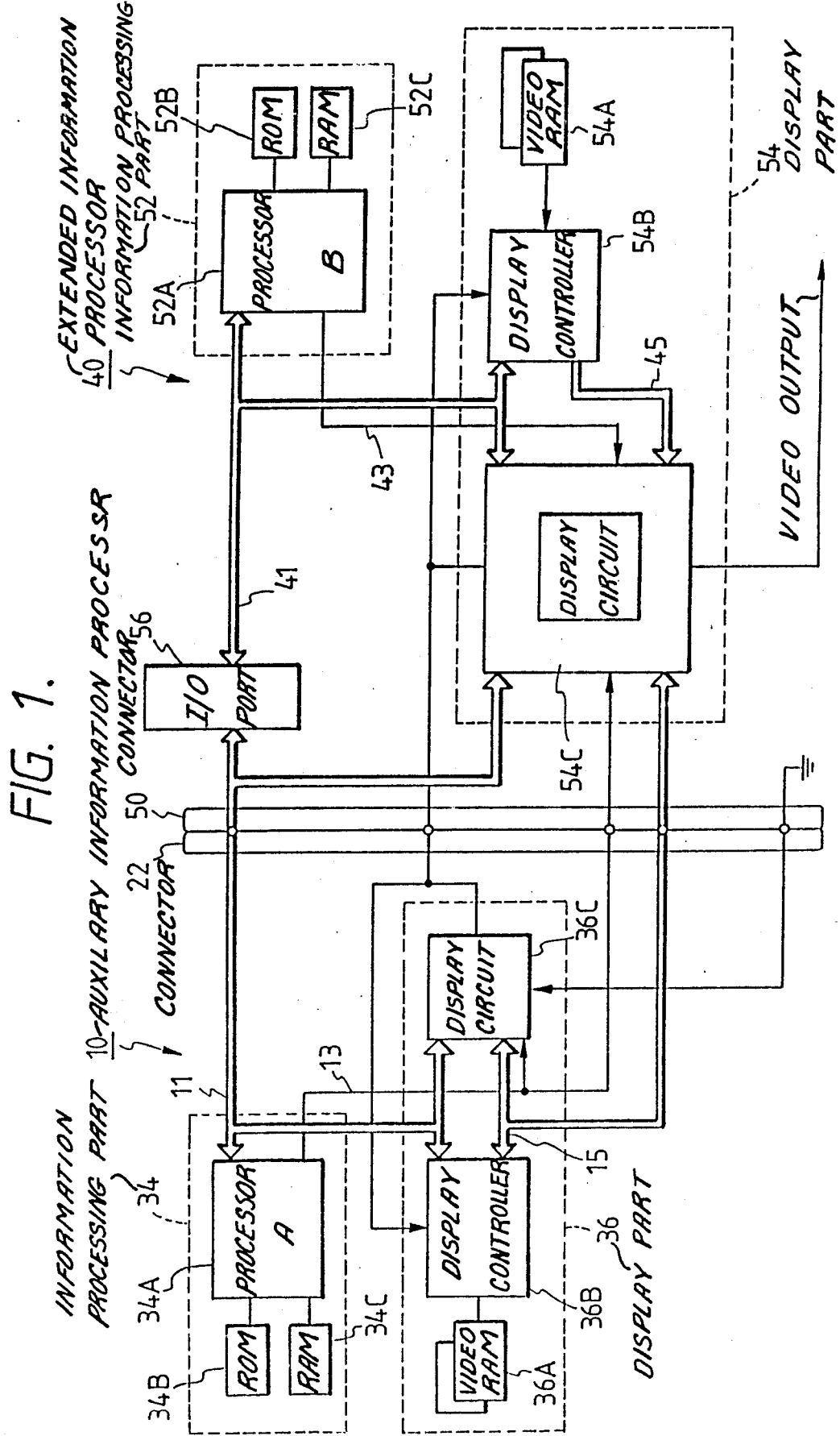
FIG. 1 is a block diagram of an embodiment of the present invention.

FIG. 1 is a block diagram showing the "incorporated" or "docked" state of auxiliary information processor 10 and extended information processor 40. Auxiliary information processor 10 and extended information processor 40 are connected electrically with each other by the interconnection of connector 22 and connector 50.

Arithmetic processor 34A is connected to input-output port 56 and display circuit 54C through a data and address bus 11, connector 22 and connector 50, and arithmetic processor 52A is connected to input-output port 56 through a data and address bus 41. Arithmetic processor 52A is connected to a display controller 54B and to a display circuit 54C which composes the output from display controller 36B of the auxiliary information processor 10 and the output of the self-display controller 54B and also outputs a synchronizing signal at the time auxiliary information processor 10 and extended information processor 40 are docked. Arithmetic processor 52A is arranged to provide a chip selector signal 43 to display circuit 54C. Display controller 54B is connected to display circuit 54C through a video data bus 45. Display circuit 54C is arranged to apply a horizontal synchronizing signal, a vertical synchronizing signal and a dot clock signal to display controller 54B and also to apply them to display controller 36B of information processor 10 through connector 22 and connector 50.

When auxiliary information processor 10 is docked with extended information processor 40, arithmetic processor 34A is connected to display controller 36B which reads display data by a synchronizing signal from extended information processor 40 when docked and otherwise by a synchronizing signal from internal display circuit 36C, which will be described later, and to display circuit 36C which stops the display function because signal line 17 is grounded via connector 22 and connector 50 which causes the synchronous output to be at a high impedance. Arithmetic processor 34A provides a chip selector signal to display circuit 36C and also to display circuit 54C of extended information processor 40 through connector 22 and connector 50. Display controller 36B is connected to display circuit 36C through a data bus 15 and also to display circuit 54C of extended information processor 40 through connector 22 and connector 50.

Figure 2:
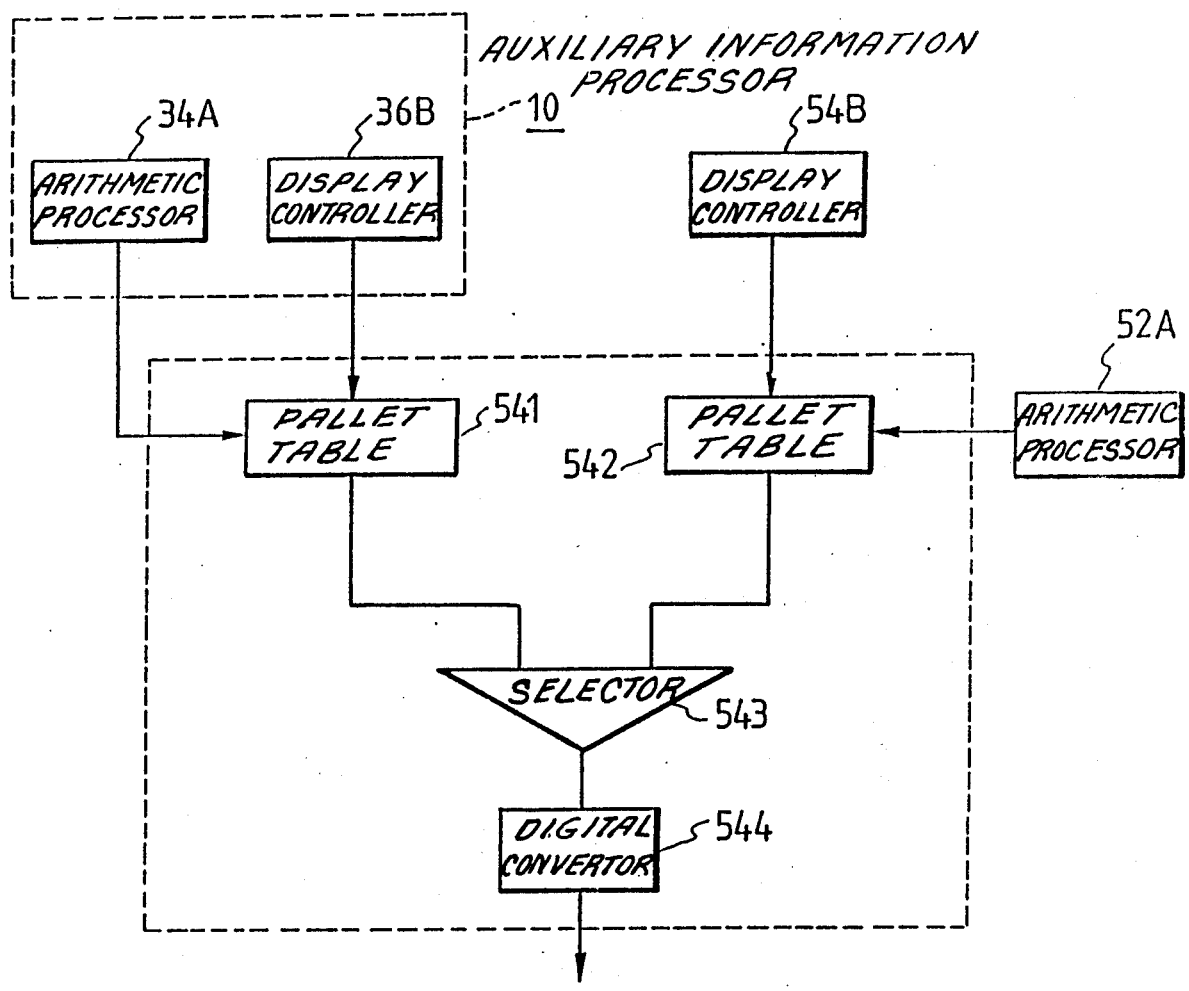
FIG. 2 is a block diagram showing the principal parts of a display circuit of an information processor used in the FIG. 1 embodiment.

FIG. 2 is a circuit diagram showing principal parts of display circuit 54C of extended information processor 40 and their interconnection with auxiliary information processor 10. Display circuit 54C includes a pallet table 541 for auxiliary information processor 10, a pallet table 542 for extended information processor 40, and a digital-to-analog converter 544 through selection of data of high priority from digital display data from both pallet tables 541 and 542. Arithmetic processor 52A provides an input to pallet table 542 and display controller 54B provides an input to pallet table 542. The outputs of pallet tables 541 and 542 are selected by a selector 543 and the output of selector 543 is coupled to a digital converter which provides the video signal output.

Figure 3:
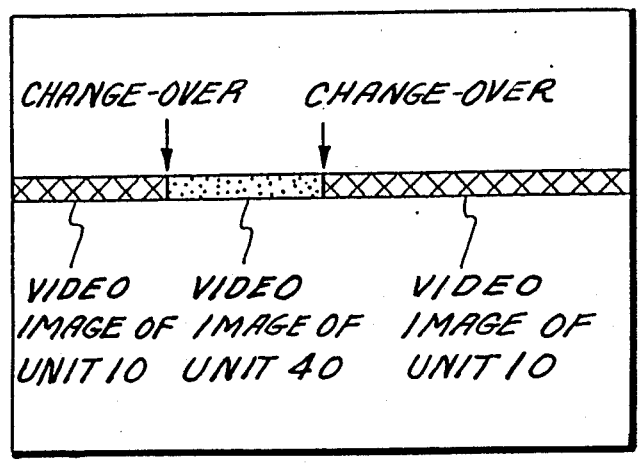
FIG. 3 is a diagram explaining the operation of the invention.

FIG. 3 explains the operation of the invention. Both auxiliary information processor 10 and extended information processor 40 may independently output video signals, as described above. Also, both information processors 10 and 40 may be mechanically docked and electrically interconnected when docked, as described previously. When these information processors 10 and 40 are docked, display circuit 36C of information processor 10 stops its display function because connector 22 and connector 50 are connected thereby to ground signal line 17 thereby causing the synchronous output to be at a high impedance. Both auxiliary information processor 10 and extended information processor 40 have access to display circuit 54C and may set the pallet information (see FIG. 2). The synchronizing signal is applied to display controller 54B and also to display controller 36B through connector 22 and connector 50. Display controller 36B of auxiliary information processor 10 reads the digital display data from the video RAM 36A with this synchronizing signal. Display controller 54B of extended information processor 40 also reads the digital display data from RAM 54A with this synchronizing signal. The read out digital display data are applied to the display part of extended information processor 40. Here, extended information processor 40 selects the data with a selector 543 based on predetermined selector information allotted to digital display data which are coupled to pallet tables 541 and 542, applies the data to digital-to-analog converter 544, and creates a video signal by composing its own digital display data and digital display data from auxiliary information processor 10. The video signal thus created is displayed as shown in FIG. 3.

Since the video image is thus composed digitally, picture images may be composed precisely, and since information is processed independently by separate information processors 10 and 40, complicated picture images may be obtained.

Although the invention has been described with two information processors (10 and 40) in the abovementioned embodiment, more than two information processors may be provided.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed:

1. A picture information composite system comprising:
    at least one extended information processor; and
    at least one auxiliary information processor, each processor comprising means for outputting a video signal independent of the other and means for coupling said extended information processor to said auxiliary information processor, configured so that they may at least be electrically joined with one another, said information processors further comprising means such that when they are joined to one another by said coupling means, said auxiliary information processor stops creating its output video signal, reads out digital display data with a synchronizing signal from said extended information processor, and provides that data to said extended information processor, said extended information processor comprising means for creating a composite video image using its own digital display data and digital display data from said auxiliary information processor.

2. A video processing system comprising:
    an extended information processor including:
        a case having an information processor housing portion accessible via a housing port in a front panel of said case,
        a first electrical connector,
        an input/output (I/O) port, coupled to said first connector,
        a first bus coupled to said I/O port,
        a first information processing part coupled to said first bus, and providing a chip select signal,
        a first display part, coupled to said first connector and to said first bus and receiving said chip select signal, for providing a video output signal; and
    an auxiliary information processor including:
        a case configured so that it can be docked with said extended information processor by slipping it into said information processor housing portion of said extended information processor via said housing port,
        a second electrical connector which is interconnected with said first connector when said auxiliary information processor is docked with said extended information processor,
        a second bus coupled to said second connector, a third bus coupled to said second connector, a second information processing part coupled to said second bus, a second display part, coupled to said second and third busses, and video output means, coupled to said second display part, for outputting a video signal from said second display part.

3. A video processing system according to claim 2 wherein said second information processing part comprises:

a Read Only Memory (ROM);

a Random Access Memory (RAM); and an arithmetic processor coupled to said ROM and to said RAM.

4. A video processing system according to claim 2 wherein said second display part comprises:

a video random access memory (video RAM);

a display control circuit coupled to said video RAM; and a display circuit coupled to said display control circuit.

5. A video processing system according to claim 2 wherein said first information processing part comprises:

an arithmetic processor;

A ROM coupled to said arithmetic processor; and a RAM coupled to said arithmetic processor.

6. A video processing system according to claim 3 wherein said first display part comprises:

a display circuit;

a video RAM; and a display controller coupled to said video RAM and to said display circuit.

7. A video processing system according to claim 6 wherein said display circuit comprises:

a first pallet table adapted to receive input from said arithmetic processor of said auxiliary information processor and from said second display part of said auxiliary information processor;

a second pallet table adapted to receive input from said display controller of said first display part and from said arithmetic processor of said first information processing part;

a selector for selecting an output from said first and second pallet tables; and a digital to analog converter, coupled to an output of said selector for providing a video output signal.

* * * * *